US009024479B2

(12) United States Patent
Chen

(10) Patent No.: US 9,024,479 B2
(45) Date of Patent: May 5, 2015

(54) SWITCHING CONVERTER AND CONTROL METHOD

(75) Inventor: Yi-Kuang Chen, Taichung (TW)

(73) Assignee: NOVATEK Microelectronics Corp., Hsin-Chu (TW)

(*) Notice: Subject to any disclaimer, the term of this patent is extended or adjusted under 35 U.S.C. 154(b) by 542 days.

(21) Appl. No.: 13/533,993

(22) Filed: Jun. 27, 2012

(65) Prior Publication Data

US 2013/0229058 A1 Sep. 5, 2013

(30) Foreign Application Priority Data

Mar. 1, 2012 (TW) .............................. 101106675 A

(51) Int. Cl.
*H02J 1/00* (2006.01)

(52) U.S. Cl.
CPC ............. *H02J 1/00* (2013.01); *H02J 2001/008* (2013.01)

(58) Field of Classification Search
USPC .......................................................... 307/82
See application file for complete search history.

(56) References Cited

U.S. PATENT DOCUMENTS

| 5,617,015 | A | 4/1997 | Goder |
| 7,432,614 | B2 | 10/2008 | Ma |
| 2004/0201281 | A1 | 10/2004 | Ma |
| 2008/0231115 | A1 | 9/2008 | Cho |

FOREIGN PATENT DOCUMENTS

| CN | 102084581 A | 6/2011 |
| KR | 1020090019422 | 2/2009 |

OTHER PUBLICATIONS

Ki, "Single-inductor multiple-output switching converters", IEEE Power Elec. Specialists Conf., Vancouver, Canada, pp. 226-231, Jun. 2001.

(Continued)

*Primary Examiner* — Robert Deberadinis
(74) *Attorney, Agent, or Firm* — Winston Hsu; Scott Margo

(57) ABSTRACT

A switching converter includes an input end, N output ends, an inductor, a charging/discharging control unit, an energy distribution control unit and a logic control unit. The input end is utilized for receiving an input voltage. The N output ends are utilized for outputting N output voltages. The inductor is utilized for storing energy of the input voltage. The charging/discharging control unit and the energy distribution control unit are respectively utilized for generating a charging/discharging control signal and N energy distribution control signals to control a charging switch and N output switches according to the N output voltages, wherein the i-th distribution control signal is corresponding to the i-th output voltage signal to the N-th output voltage signal. The logic control unit is utilized for generating the charging switch control signal and N output switch control signals according to the charging/discharging control signal and the N energy distribution control signals.

16 Claims, 11 Drawing Sheets

(56) References Cited

OTHER PUBLICATIONS

Hanh-Phuc Le, Chang-Seok Chae, Kwang-Chan Lee, Se-Won Wang, Gyu-Ha Cho, Gyu-Hyeong Cho, "A Single-Inductor Switching DC-DC Converter With Five Outputs and Ordered Power-Distributive Control", IEEE J Solid-State Circuits, pp. 2706-2714, Dec. 1, 2007.

D. Ma, W. H. Ki, C. Y. Tsui, and P. K. T. Mok, "Single-inductor multiple-output switching converters with time-multiplexing control in discontinuous conduction mode," IEEE J. Solid-State Circuits, vol. 38, pp. 89-100, Jan. 2003.

Erich Bayer, Gerhard Thiele, "A Single-Inductor Multiple-Output Converter with Peak Current State-Machine Control," Applied Power Electronics Conference and Exposition, 2006. APEC '06. Twenty-First Annual IEEE, pp. 153-159, Mar. 2006.

MAXIM, MAX685—Dual-Output Positive and Negative, DC-DC Converter for CCD and LCD—Maxim Integrated Products, 2003.

SWITCHING CONVERTER AND CONTROL METHOD

BACKGROUND OF THE INVENTION

1. Field of the Invention

The present invention relates a switching converter and related control method, and more particularly, to a switching converter capable of immediately monitoring total energy of inductor and flexibly performing energy distribution and related control method.

2. Description of the Prior Art

DC/DC converter is mainly utilized for adjusting voltage levels (boost or buck) such that the voltage levels are stable at set voltage for providing operation voltages required by the electronic device. A single inductor multiple output (SIMO) switching converter can provide multiple different output voltages via a structure of single inductor. Therefore, the SIMO switching converter is suitably for portable electronic devices or system-on-chips. Please refer to FIG. 1, which is a schematic diagram of a conventional SIMO switching converter 10. As shown in FIG. 1, an inductor 100 receives an input voltage VI through an input end IN for storing energy. Via a charging switch SW0 and output switches SW1-SW4 controlled by a control circuit 102, the energy stored in the inductor 100 are distributed to output capacitors CO1-CO4, respectively, for providing output voltage signals VO_1-VO_4 to loads Load1-Load4 through output ends OUT1-OUT4. In other words, the SIMO switching converter 10 can respectively provide the output voltage signals VO_1-VO_4 to the loads Load1-Load4. In short, the SIMO switching converter 10 can store energy from a voltage source and further distribute the stored energy for providing multiple output voltage signals.

The operation modes of the SIMO switching converter 10 are mainly classified into a charging/discharging mode and an energy distribution mode. The charging/discharging mode represents the charging or discharging operations of the inductor 100. The energy distribution mode represents the energy distribution operations of the energy stored in the inductor 100. In the charging/discharging mode, the inductor 100 performs the charging or discharging operations, and an inductor current of the inductor 100 is accordingly increased or decreased. In the energy distribution mode, various energy distribution operations can be performed according to requirements of applications. For example, when the SIMO switching converter 10 is utilized in a buck mode, the SIMO switching converter 10 can store energy in the inductor 100 and distribute the energy stored in the inductor 100 at the same time. Or, when the SIMO switching converter 10 is utilized in a boost mode, the SIMO switching converter 10 can store energy in the inductor 100 for a certain time and distribute the energy stored in the inductor 100 in the energy distribution mode.

The charging switch SW0 and output switches SW1-SW4 are controlled by the control circuit 102 in both the charging/discharging mode and the energy distribution mode, for outputting the energy stored in the inductor 100 to each load. Generally, the control circuit 102 controls each switch via different modulation methods in a fixed operational frequency. For example, common fixed frequency controls comprise the bang-bang control (or the hysteresis control) and the pulse width modulation control. Please refer to FIG. 2, which is a schematic diagram of an SIMO switching converter 20 using the bang-bang control. Different from FIG. 1, the SIMO switching converter 20 includes a control circuit 202 adapting the bang-bang control. The control circuit 202 includes voltage scalers VS1-VS4, comparators COM1-COM4 and a logic control unit 204. The voltage scalers VS1-VS4 are coupled to output ends OUT1-OUT4, for receiving output voltage signals VO_1-VO_4. As shown in FIG. 2, the comparator COM1 generates a comparing signal SP_1 to the logic control unit 204 according to the signal outputted by the voltage scaler VS1 and a reference voltage signal Vref. Similarly, the comparator COM2-COM4 respectively generate comparing signals SP_2-SP_4 according to the signals outputted by the voltage scalers VS2-VS4 and the reference voltage Vref. The logic control unit 204 generates charging control signal SC_0 and output control signals SC_1-SC_4 according to the comparing signals SP_1-SP_4, for controlling the charging switch SW0 and the output switches SW1-SW4. In other words, the operations of charging/discharging and energy distribution of the SIMO switching converter 20 are determined by controlling the conducting sequence of the charging switch SW0 and the output switches SW1-SW4. In detail, the control circuit 202 utilizes the comparators COM1-COM4 and the logic control unit 204 for determining whether the total energy stored in the inductor 100 is too high or too low (in the charging/discharging mode), and distributing the energy to the output ends OUT1-OUT4 to provide output voltage signals VO_1-VO_4 (in the energy distribution mode). Since the comparator can be regarded as an amplifier with high gain, the comparators COM1-COM4 can rapidly adjust the comparing signals SP_0-SP_4 when the loads Load1-Load4 have different load variations. As a result, the control circuit 202 adapting the bang-bang control rapidly reflects the load status. However, rapid reflection for the load status results in problems such as misoperations, huge output voltage ripple, and huge ripple on the current of the inductor 100.

Please refer to FIG. 3, which is a schematic diagram of a conventional SIMO switching converter 30 using the pulse width modulation control. Different from FIG. 2, a control unit 302 configures an error amplifier EA, a pulse width modulator 304 and a capacitor C for detecting the energy distributed to the output voltage signal of the last stage, to determine the total energy required by the inductor 100 in the charging/discharging mode. The pulse width modulator 304 generates a comparing signal SP_5 to the logic control unit 204 according to an error voltage signal Ve outputted by the error amplifier EA and an inductor voltage signal Vsen. Please refer to FIG. 4, which is a schematic diagram of the pulse width modulator 304 shown in FIG. 3. The pulse width modulator 304 includes a comparator COM and an adder 402. The adder 402 pluses an inductor voltage signal Vsen and a triangular wave signal Va for generating a ramp signal Vramp. The comparator COM compares the error voltage signal Ve and the ramp signal Vramp and accordingly generates the comparing signal SP_5. A flying wheel switch SW_F coupled across the inductor 100 is utilized for controlling the continuous conducting mode of the SIMO switching converter 30. Please jointly refer to FIG. 3 and FIG. 4, when the energy acquired by the output voltage signal VO_4 is low, the error voltage signal Ve outputted by the error amplifier Ea is increased. As a result, the duty ratio of the comparing signal SP_5 outputted by the comparator 402 is accordingly increased. In such a condition, the logic control unit 204 accordingly generates related control signals for storing more energy to generate related output voltage signals, to regulate the output voltage signals. In other words, the control circuit 402 sets the priority of the output voltage signal VO_4 to a lowest priority, and the pulse width modulator 304 provides the corresponding comparing signal SP_5 to the logic control unit 204 when the energy of the voltage signal VO_4 is insufficient. The logic control unit 204 then accordingly prolongs the conducting time of the corresponding switch for prolonging charging time of the inductor 100, to achieve the goal of controlling the charging/discharging mode.

The SIMO switching converter 30 shown in FIG. 3 uses the bang-bang control in the energy distribution mode, and uses the pulse width modulation control in the charging/discharging mode for determining the total energy required by the inductor 100 in the charging/discharging mode. However, since the charging/discharging mode is determined by the output signal with the lowest priority (i.e. the output voltage VO_4) and the output voltage signal with the lowest priority can only acquire remaining energy, the voltage signal with the lowest priority can not reflect current status to the output stages with higher priority and the reaction time of the inductor current would be slower.

On the other hand, please refer to FIG. 5, which is a schematic diagram of a SIMO switching converter 50 using the pulse width modulation control. Different from FIG. 3, the SIMO switching converter 50 utilizes the pulse width modulation control on all the output paths. In other words, the SIMO switching converter 50 adapts the pulse width modulation control in both the charging/discharging mode and the energy distribution mode. A control circuit 502 includes error amplifiers EA_1-EA_4, capacitors C1-C4, switches SW_P1-SW_P4, a phase controller 504 and a pulse width modulator 506. The SIMO switching converter 50 realizes the time multiplexed control via the phase controller 504 controls the switches SW_P1-SW_P4, to achieve the charging/discharging control and energy distribution. However, since utilizing the time multiplexed control, there are multiple times of the charging/discharging mode in a time period. In such a condition, the switching times of the switches increases such that the switching loss increases. In addition, the SIMO switching converter 50 using the pulse width modulation control on both charging/discharging mode and the energy distribution mode results in limiting the maximum operation frequency and the flexibility of structure extension.

In brief, for the switching converter using the structure of providing multiple different output voltages via an inductor, how to immediately determines the charging time of the inductor and flexibly distribute energy should be a focus in progressive circuit design.

SUMMARY OF THE INVENTION

Therefore, one of goals of the present invention is providing a switching converter and related control method.

According to an embodiment of the present invention, the embodiment discloses a switching converter. The switching converter comprises an input end, for receiving an input voltage; N output ends, for outputting N output voltage signals wherein N is a positive integer; an inductor, coupled to the input end for storing energy of the input voltage; a charging switch, coupled to the inductor for controlling a charging path of the inductor according to a charging switch control signal; N output switches, coupled to the inductor for controlling signal transmitting paths between the inductor and the N output ends according to N output switch control signals; a charging/discharging control unit, coupled to the N output ends for generating a charging/discharging control signal according to an inductor voltage signal and the N output voltage signals; an energy distribution control unit, coupled to the N output ends for generating N energy distribution control signals according to the N output voltage signal, wherein the i-th energy distribution control signal relates to the i-th output voltage signal to the N-th output voltage signal, $1 \leq i \leq N$; and a logic control unit, for generating the charging switch control signal according to the charging/discharging control signal and the N energy distribution control signals for controlling an on/off state of the charging switch, and generating the N output switch control signals for controlling on/off states of the N output switches, such that the energy of the input voltage stores in the inductor and the energy stored in the inductor distributes to the N output ends.

According to another embodiment of the present invention, the embodiment discloses a control method. The control method comprises providing a switching converter, comprising an input end for receiving an input voltage; N output ends for outputting N output voltage signals wherein N is a positive integer; an inductor coupled to the input end for storing the energy of the input voltage, a charging switch coupled to the inductor for controlling the charging path of the inductor according to a charging switch control signal; and N output switches coupled to the inductor for controlling the signal transmitting paths between the inductor and the N output ends according to N output switch control signals; generating a charging/discharging control signal according to an inductor voltage signal and the N output voltage signals; generating N energy distribution control signals according to the N output voltage signals, wherein the i-th energy distribution control signal relates to the i-th output voltage signal to the N-th output voltage signal, $1 \leq i \leq N$; and generating the charging switch control signal for controlling the charging switch and generating the N output switch control signals for controlling the N output switches according to the charging/discharging control signal and the N energy distribution control signal, such that the energy of the input voltage stores in the inductor and the energy stored in the inductor distributes to the N output ends.

These and other objectives of the present invention will no doubt become obvious to those of ordinary skill in the art after reading the following detailed description of the preferred embodiment that is illustrated in the various figures and drawings.

DETAILED DESCRIPTION

Figure 6:
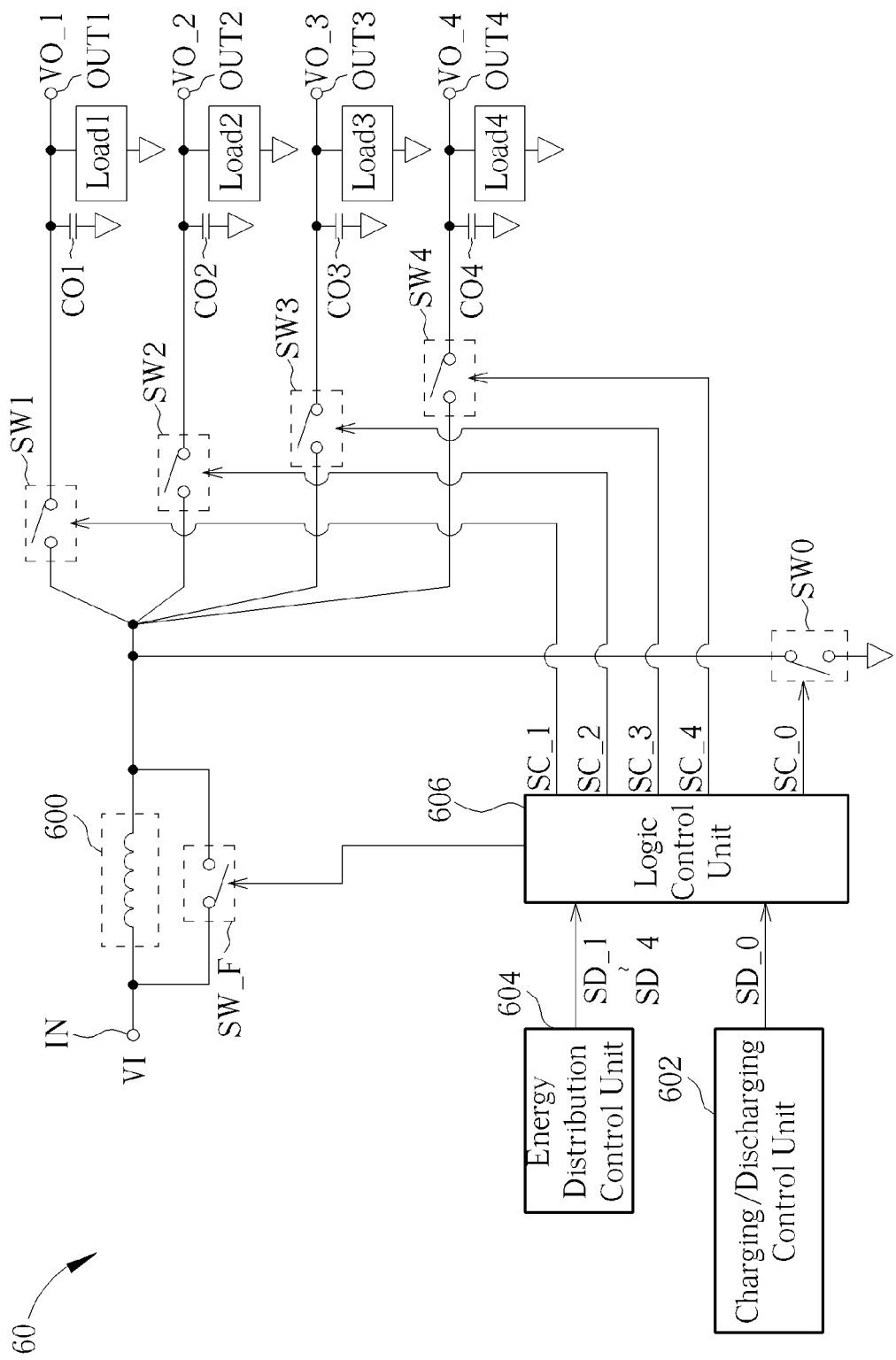
FIG. 6 is a schematic diagram of a switching converter according to an embodiment of the present invention.

Please refer to FIG. 6, which is a schematic diagram of a switching converter 60 according to an embodiment of the present invention. The switching converter 60 includes an input end IN, an inductor 600, output ends OUT1-OUT4, output capacitors CO1-CO4, a charging switch SW0, output switches SW1-SW4, a charging/discharging control unit 602, an energy distribution control unit 604 and a logic control unit 606. The input end IN is utilized for receiving an input voltage VI. The output ends OUT1-OUT4 are utilized for outputting output voltage signals VO_1-VO_4. The inductor 600 is coupled to the input end IN for storing the energy of the input voltage VI. The charging switch SW0 is coupled to the inductor 600 for controlling the charging path of the inductor 600 according to a charging switch control signal SC_0. The output switches SW1-SW4 are respectively coupled to the output ends OUT1-OUT4 and the inductor 600 for controlling signal transmitting path between the inductor 600 and the output ends OUT1-OUT4 according to output switch control signals SC_1-SC_4. The output capacitors CO1-CO4 is utilized for storing the energy of the inductor 600, to provide output voltage signals VO_1-VO_4 to the output ends OUT1-OUT4.

The charging/discharging unit 602 is coupled to the output ends OUT1-OUT4 (not shown in FIG. 6) and the logic control unit 606 for generating a charging/discharging control signal SD_0 to the logic control unit 606 according to output voltage signals VO_1-VO_4 and an inductor voltage signal Vsen. The energy distribution control unit 604 is coupled to the output ends OUT1-OUT4 (not shown in FIG. 6) for generating energy distribution control signals SD_1-SD_4 according to the output voltage signals VO_1-VO_4. Wherein, the i-th energy distribution control signal relates to the i-th output voltage signal to the output voltage signal of the final stage (i.e. the output voltage signals VO_i-VO_4), 1≤i≤4.

In brief, the present invention determines whether the energy stored in the inductor 600 is sufficient via the charging/discharging control unit 602, ex. determining the magnitude of a sum of all the output voltage signals, then accordingly generates the charging/discharging control signal SD_0 to the logic control unit 606. On the other hand, the present invention can determine variations of related output voltage signals via the energy distribution control unit 604, and can accordingly generate the energy distribution control signals SD_1-SD_4 to the logic control unit 606. In other words, the energy distribution control unit 604 considers the variations of post output voltage signals for generating corresponding energy distribution control signals to logic control unit 606. For example, when the energy distribution control unit 604 considers how to distribute the energy stored on the inductor 600 to the output end OUT2 for generating output voltage signal VO_2, the energy distribution control unit 604 can realize flexible energy distribution in an energy distribution mode via measuring the output voltage signals VO_3 and VO_4. Further, according to the charging/discharging control signal SD_0 and the energy distribution control signals SD_1-SD_4, the logic control unit 606 generates the charging switch control signal SC_0 for controlling the charging switch SW0 and generates the switch control signals SC_1-SC_4 for controlling the output switches SW_1-SW_4, such that the energy of the input voltage VI stores in the inductor 600 and the energy stored in the inductor 600 distributes to the output ends OUT_1-OUT_4.

Figure 7:
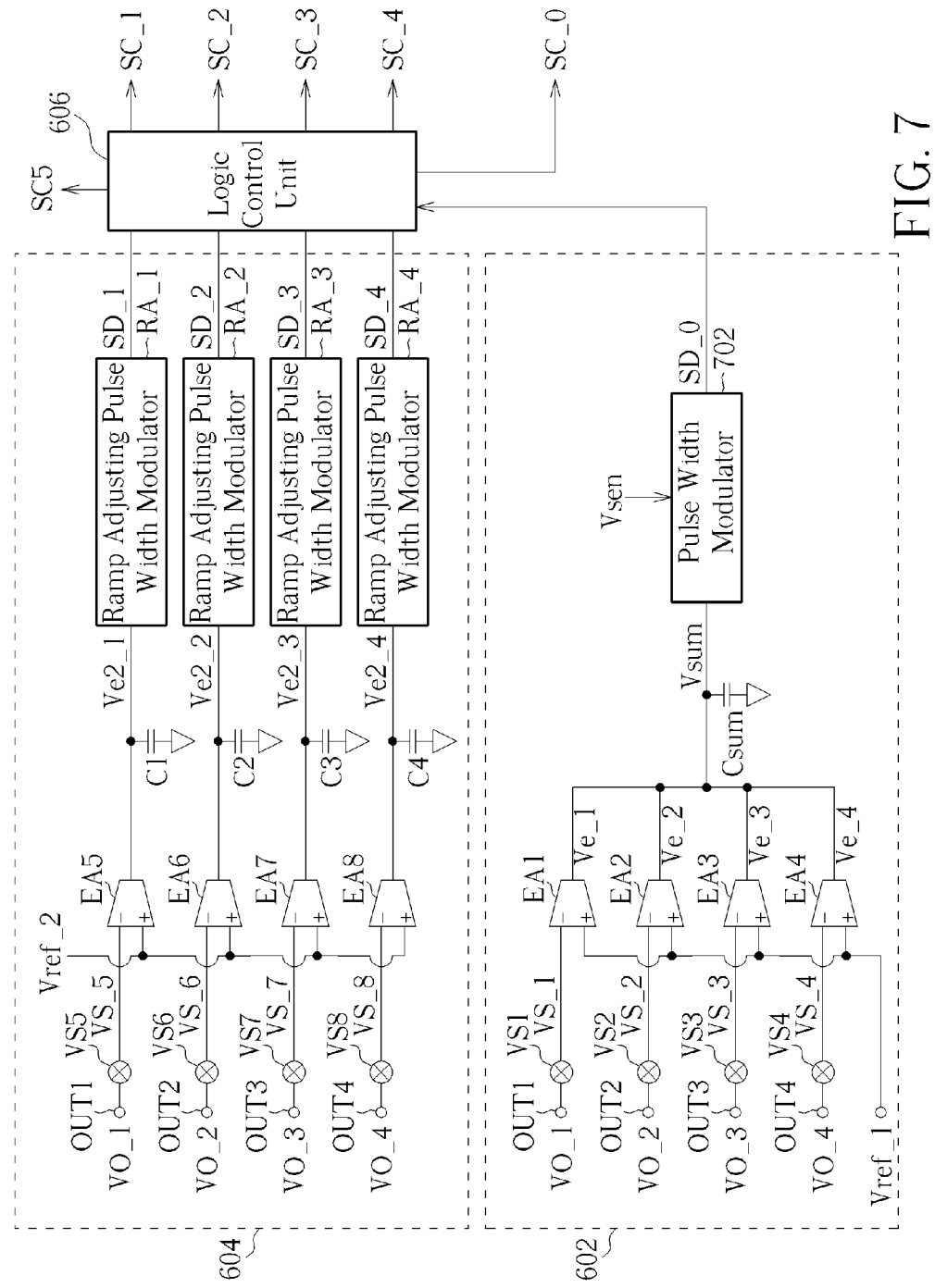
FIG. 7 is a schematic diagram of the charging/discharging control unit and the energy distribution control unit shown in FIG. 6.

Please refer to FIG. 7, which is a schematic diagram of the charging/discharging control unit 602 and the energy distribution control unit 604 shown in FIG. 6. As shown in FIG. 7, the charging/discharging control unit 602 includes voltage scalers VS1-VS4, error amplifiers EA1-EA4, a capacitor Csum and pulse width modulator 702. The voltage scalers VS1-VS4 are respectively coupled to the output ends OUT1-OUT4 for outputting scaling voltage signals VS_1-VS_4 according to the output voltage signals VO_1-VO_4. The error amplifiers EA1-EA4 are respectively coupled to the voltage scalers VS1-VS4 for generating error voltage signals Ve_1-Ve_4 according to scaling voltage signals VS_1-VS_4 and a reference voltage signal VREF_1. The capacitor Csum is coupled to the error amplifiers EA1-EA4 for generating a sum voltage signal Vsum according to the error voltage signals Ve_1-Ve_4. The pulse width modulator 702 is coupled to the error amplifiers EA1-EA4 and the capacitor Csum for generating the charging/discharging control signal SD_0 according to the sum voltage signal Vsum.

In detail, each voltage scaler of the charging/discharging control unit 602 is coupled to an output end and outputs corresponding scaling voltage signal according to the corresponding output voltage signal. Next, each error amplifier of the charging/discharging control unit 602 is coupled to one of the voltage scalers VS1-VS4 and generates the corresponding error voltage signal according to the corresponding first scaling voltage signal and the reference voltage signals Vref_1. The error voltage signals Ve_1-Ve_4 of the error amplifiers EA1-EA4 charge the capacitor Csum, and the capacitor Csum therefore generates the sum voltage signal Vsum to the pulse width modulator 702. The pulse width modulator 702 then generates the charging/discharging control signal SD_0 according to the sum voltage signal Vsum and the inductor voltage signal Vsen. Wherein, the inductor voltage signal Vsen may be a sensing voltage signal of the inductor 600. In such a condition, since energy of each output end can be referred to each corresponding error amplifier, the sum voltage signal Vsum equals a sum of the output signal of each error amplifier for each set of the output voltage signals. Meanwhile, the sum voltage signal Vsum also represents the total energy required by switching converter 60 in charging/discharging mode. Therefore, the system is indicated to provide more energy to the output voltage signals when the charging/discharging control signal SD_0 indicates the total energy is insufficient, to regulate the output voltage signals. The logic control unit 606 then generates the charging switch control signal SC_0 for controlling the charging switch SW0, such that the energy of the input voltage VI continuously stores in the inductor 600 to increase the energy the inductor 600 can provide, and vice versa.

In brief, in the control operations of the charging/discharging control unit 602, whether the energy in charging/discharging mode is sufficient is immediately determined via detecting the sum of outputs signals of the error amplifiers. Different from the single inductor multiple output (SIMO) switching converter 30 shown in FIG. 3 determines whether the energy in charging/discharging mode is sufficient until the last stage of error amplifier outputs the output voltage signal, the present invention can immediately reflect the needed energy sum and timely stores more energy in the inductor 600 to avoid the energy distributed to each output ends in the energy distribution mode is insufficient.

Please further refer to FIG. 7, the energy distribution control unit 604 includes voltage scalers VS5-VS8, error amplifiers EA5-EA8, capacitors C1-C4 and ramp adjusting pulse width modulators RA_1-RA_4. As shown in FIG. 7, the voltage scalers VS5-VS8 are coupled to the output ends OUT1-

OUT4, respectively, for outputting scaling voltage signals VS_5-VS_8 according to the output voltage signals VO_1-VO_4. The error amplifiers EA5-EA8 are coupled to the voltage scalers VS5-VS8, respectively, for generating error voltage signals Ve2_1-Ve2_4 according to the scaling voltage signals VS_5-VS_8 and a reference voltage signal Vref_2. The ramp adjusting pulse width modulators RA_1-RA_4 are coupled to the error amplifiers EA5-EA8, respectively, for generating energy distribution control signals SD_1-SD_4 according to the error voltage signals Ve2_1-Ve2_4. Wherein the i-th energy distribution control signal (i.e. the energy distribution control signal SD_i) relates to the i-th output voltage signal (i.e. the output voltage signal VO_i) to the output voltage signal VO4. For example, the energy distribution control signal SD_2 relates to the output voltage signals VO_2-VO_4.

Figure 8:
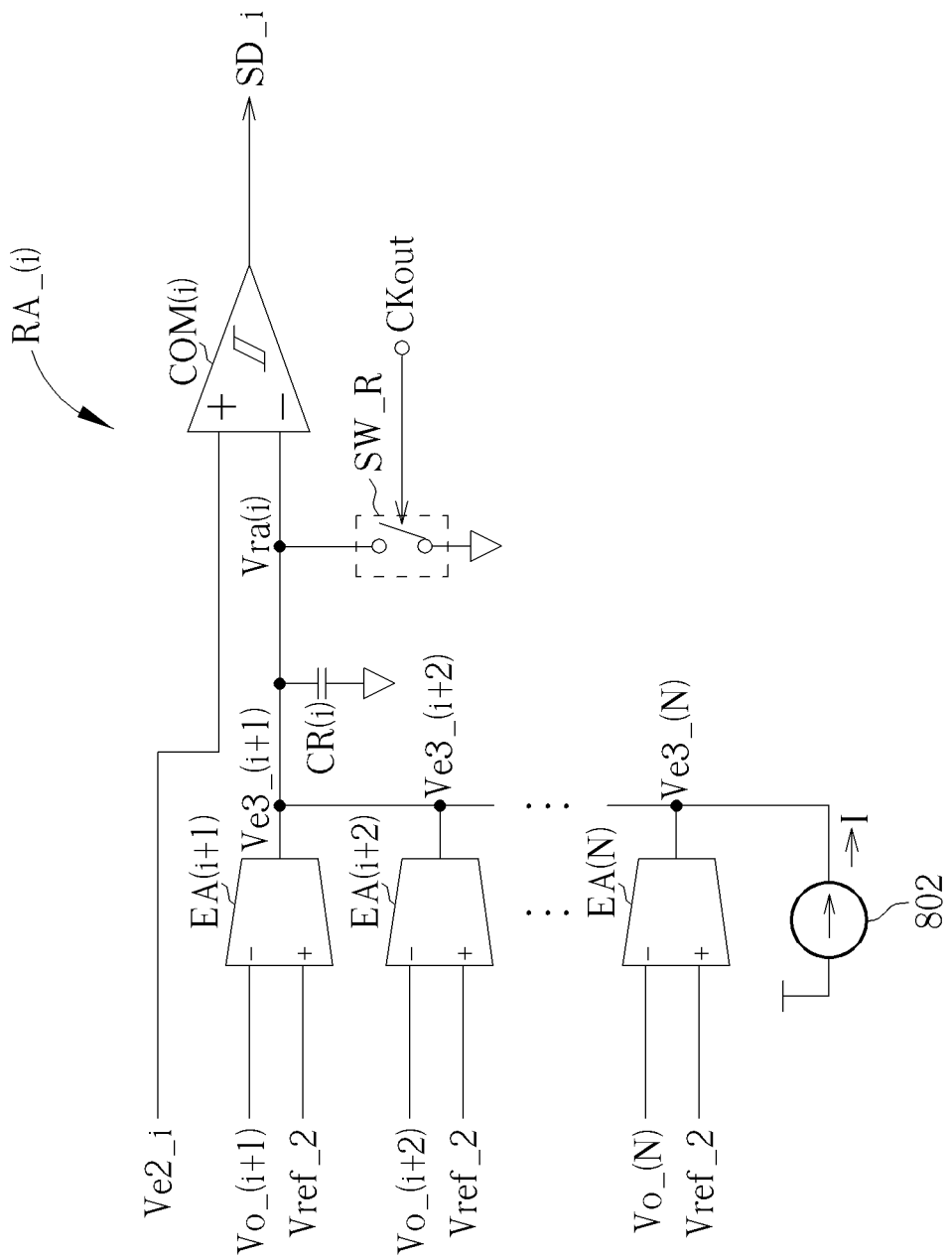
FIG. 8 is a schematic diagram of related signals of the ramp adjusting pulse width modulator shown in FIG. 7.

Specifically, please refer to FIG. 8, which is a schematic diagram of the ramp adjusting pulse width modulators RA_1-RA_4 shown in FIG. 7. As shown in FIG. 8, the ramp adjusting pulse width modulator RA_(i) represents the i-th ramp adjusting pulse width modulator, $1 \leq i \leq N$. Since the switching converter 60 provides four output voltage signals, the number N is four. The ramp adjusting pulse width modulator RA_(i) includes (N−i) error amplifiers (i.e. the error amplifier EA(i+1)-EA(N)), a capacitor CR(i) and a comparator COM(i). The error amplifiers EA(i+1)-EA(N) are coupled to the output ends OUT(i+1)-OUT(N), respectively, for generating error voltage signals Ve3_(i+1)-Ve3_(N). The error voltage signals Ve3_(i+1)-Ve3_(N) charge the capacitor CR(i) for generating a ramp signal Vra(i) to the comparator COM(i). In such a condition, the ramp signal Vra(i) relates to the (i+1)-th output voltage signal to the N-th output voltage signal. The comparator COM(i) is utilized for generating the energy distribution control signal SD_(i) to the logic control unit 606 according to the error voltage signal Ve2_(i) and the ramp signal Vra(i), such that immediate output voltage regulation can be achieve via the logic control unit 606. In other words, the i-th ramp adjusting pulse width modulator (i.e. ramp adjusting pulse width modulator RA(i)) not only has information of energy outputted by the i-th output end (i.e. the output end OUT (i)), but acquires the information of energy outputted by the post output ends (i.e. the output ends OUT(i+1)-OUT(N)).

In the present invention, each ramp adjusting pulse width modulator considers variations of output voltage signals of post stages, such that the slope of ramp signal Vra(i) varies with the output voltage signals of post stages. For example, the ramp adjusting pulse width modulator RA_2 not only considers the outputted energy information of the output end OUT2, but acquires the outputted energy information of output ends OUT3 and OUT4 via the ramp signal Vra(2). When the output voltage signal of the 2nd stage (i.e. the output signal VO_2) is low, the charging/discharging control unit 602 generates the charging/discharging control signal SD_0 according to the sum voltage signal Vsum, for indicating the logic control unit 606 the energy in the charging/discharging needs to be increased. At the meantime, the error voltage signal Ve2_2 is increased for indicating the ramp adjusting pulse width modulator RA_2 the energy inductor 600 distributes to the output end OUT2 is low. In such a condition, if the output voltage signal VO_3 of the output end OUT3 is also low, the ramp signal Vra(2) increases, such that the pulse width, outputted after comparing the ramp signal Vra(2) and the error voltage signal Ve2_2 via the comparator COM_2, is limited. The logic control unit 606 is indicated that since the energy distributed to the output end OUT2 is insufficient and the output signal VO_3 of the post stage (i.e. the output end OUT3) is also insufficient, the maximum voltage of energy distributed to the output end OUT2 therefore needs to be limited. Thus, when the error voltage signal Ve2_2 indicates that the energy distributed to the output end OUT2 is insufficient and the ramp signal Vra(2) indicates energies distributed to the output ends OUT3 and OUT4 are insufficient, the energy distribution control signal SD_2 of the comparator COM_2 is accordingly adjusted. In such a condition, the logic control unit 606 decreases the energy distributed to the output end OUT2, for preventing the stored energy of the inductor 600 intensely distributes to the output end OUT2. Meanwhile, since the stored energy of the inductor 600 is insufficient for all the output ends, the charging/discharging unit 602 accordingly control the inductor 600 is continuously charged for storing more energy. In brief, via feed-forwarding the energy statuses of post stages, the energy distribution control unit 604 has control ability of immediately reflecting the post stage energy information and flexibly adjusting distributed energy weights in the energy distribution method.

In FIG. 8, the ramp adjusting pulse width modulator RA_(i) further includes a reset switch SW_R for periodically resetting the ramp signal Vra(i) according to a reset control signal CKout with short pulse width, to achieve periodical pulse width modulation control. In other words, the ramp signal Vra(i) with tunable slope can be periodically discharged for achieving fixed frequency control. Besides, the ramp adjusting pulse width modulation RA_(i) further includes a current source 802 for providing a current I to the capacitor CR(i), to compensate the whole system stability.

Figure 4:
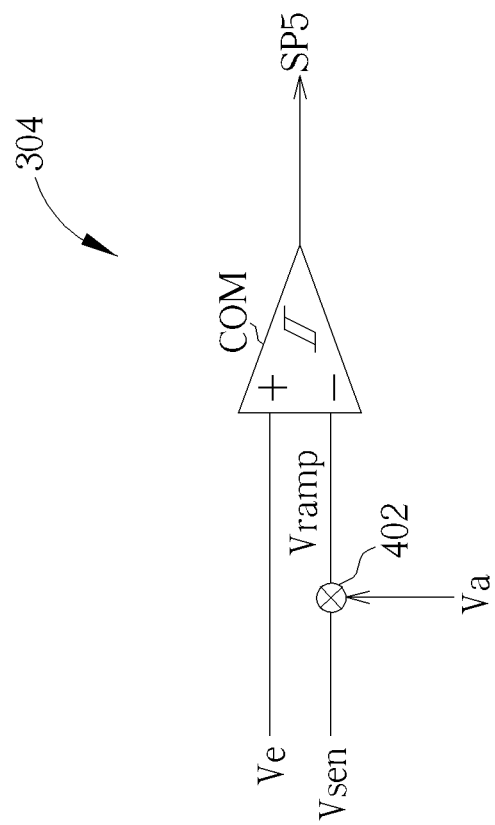
FIG. 4 is a schematic diagram of the pulse width modulator shown in FIG. 3.
Figure 5:
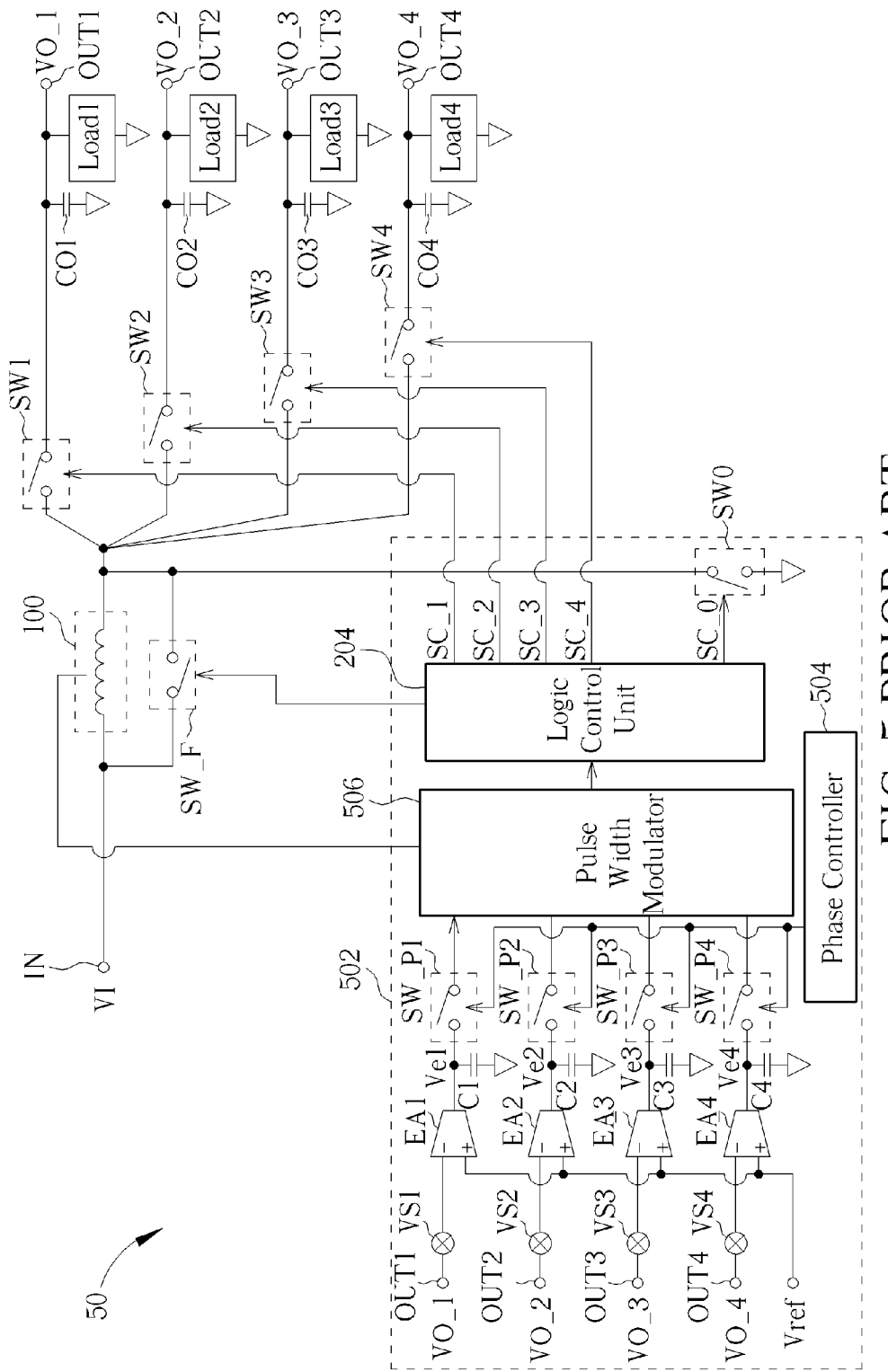
FIG. 5 is a schematic diagram of another conventional single inductor multiple output switching converter using the pulse width modulation control.
Figure 9:
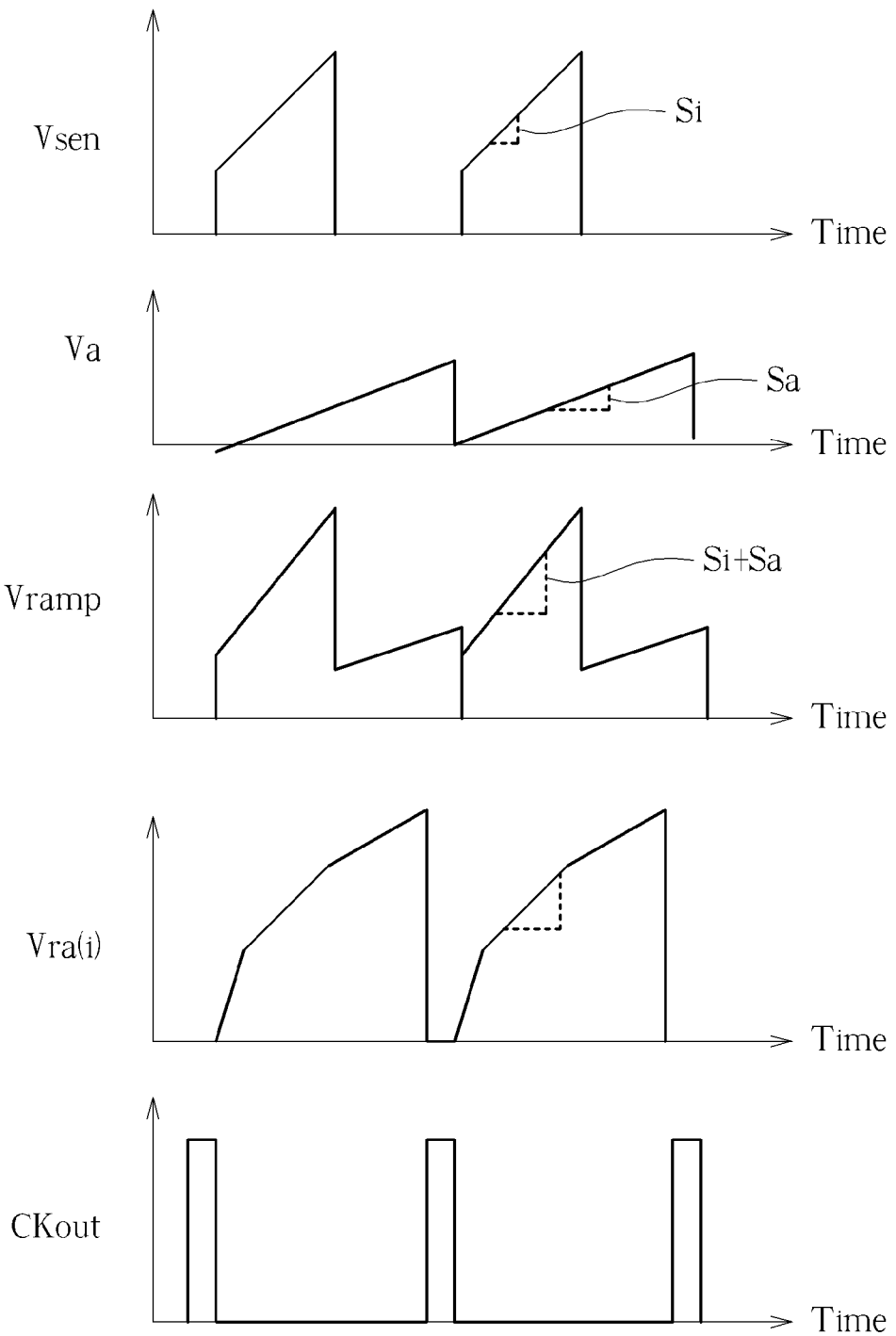
FIG. 9 is a schematic diagram of related signals of the pulse width modulator shown in FIG. 4 and the ramp adjusting pulse width modulator shown in FIG. 8.

Please refer to FIG. 9, which is a waveform chart of related signals of the pulse width modulator 304 shown in FIG. 4 and the ramp adjusting pulse width modulator RA(i) shown in FIG. 8, wherein the inductor voltage signal Vsen with a slope Si represents the sensing voltage signal of the inductor 600. The triangular wave Va represents the triangular wave Va shown in FIG. 4. The ramp signal Vramp with a slope (Si+Sa) represent the ramp signal Vramp shown in FIG. 4. The ramp Vra(i) represent the ramp signal Vra(i) shown in FIG. 8. The reset control signal CKout represent the reset control signal CKout shown in FIG. 8. Generally, the conventional pulse width modulation controls are classified into voltage mode (VM) or current mode (CM) according to the generating method of the ramp signal Vramp. If the generating method of the ramp signal Vramp relates to the inductor current (Vsen), the pulse width modulation control is current mode. If the generation method of the ramp signal Vramp does not relate to the inductor current (Vsen), the pulse width modulation control is voltage mode. As shown in FIG. 4, the conventional pulse width modulation control utilizes the ramp signal Vramp generated by adding the inductor current Vsen and the triangular signal Va with a fixed slope for comparing with the corresponding error voltage signal. However, when the slope of the ramp signal Vramp is greater, the acquired pulse width is smaller in the same error voltage level. In comparison, the ramp signal Vra(i) relates to the energy of post stages in the present invention, the slope of the ramp signal Vra(i) varies with the variation of output voltage signals of post stages, as shown in FIG. 9. In other words, the present invention has control ability of immediately reflecting the post stage energy information and flexibly adjusting distributed energy weights in the energy distribution mode.

Figure 10:
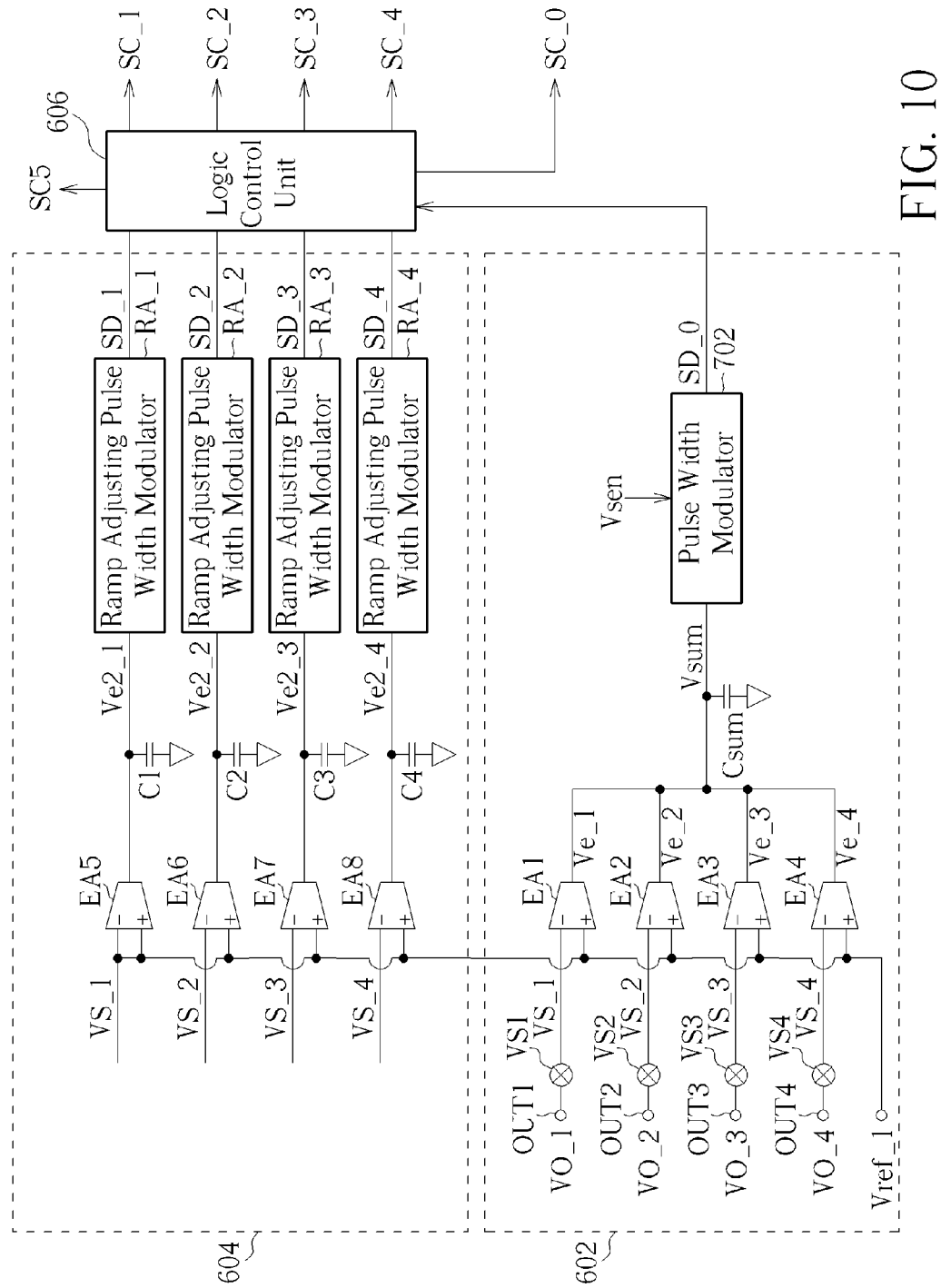
FIG. 10 is another schematic diagram of the charging/discharging control unit and the energy distribution control unit shown in FIG. 7.

Noticeably, the above embodiments are utilized for illustrating the present invention and are not limitations of the present invention. Those skilled in the art can accordingly observe different modifications. For example, the switching converter 60 is illustrating the embodiment of the switching converter with four output voltage signals, but is not limited herein. Any structures of switching converter utilizing single inductor for providing multiple output voltage signals can be achieved by the charging/discharging control unit, the energy distribution control unit, and the logic control unit of the present invention, the relative components of which can be appropriately modified according to the number of the output voltage signals. Besides, the charging/discharging control unit 602 and the energy distribution control unit 604 can mutually use the same voltage scaler. For example, please refer to FIG. 10, which is another schematic diagram of the charging/discharging control unit 602 and the energy distribution control unit 604 shown in FIG. 7. The energy distribution control unit 604 can omit the voltage scalers VS5-VS8. In other words, the error amplifiers EA5-EA8 are coupled to the voltage scalers VS1-VS4, for receiving the scaling voltage signals VS_1-VS_4 outputted by the voltage scalers VS_1-VS_4 and generating the error voltage signals Ve2_1-Ve2_4 according to the scaling voltage signals VS_1-VS_4 and the reference voltage signal Vref. On the other hand, the switching converter 60 shown in FIG. 6 further includes a flying-wheel switch SW_F coupled cross the inductor 600. The logic control unit 606 generates a flying-wheel switch control signal SC_5 for controlling the flying-wheel switch SW_F, to switch the switching converter 60 to a pseudo continuous current conduction (PCCM) mode. If the system does not need to operate in PCCM, the flying switch SW_F and the flying-wheel switch SC_5 can be omitted.

Figure 11:
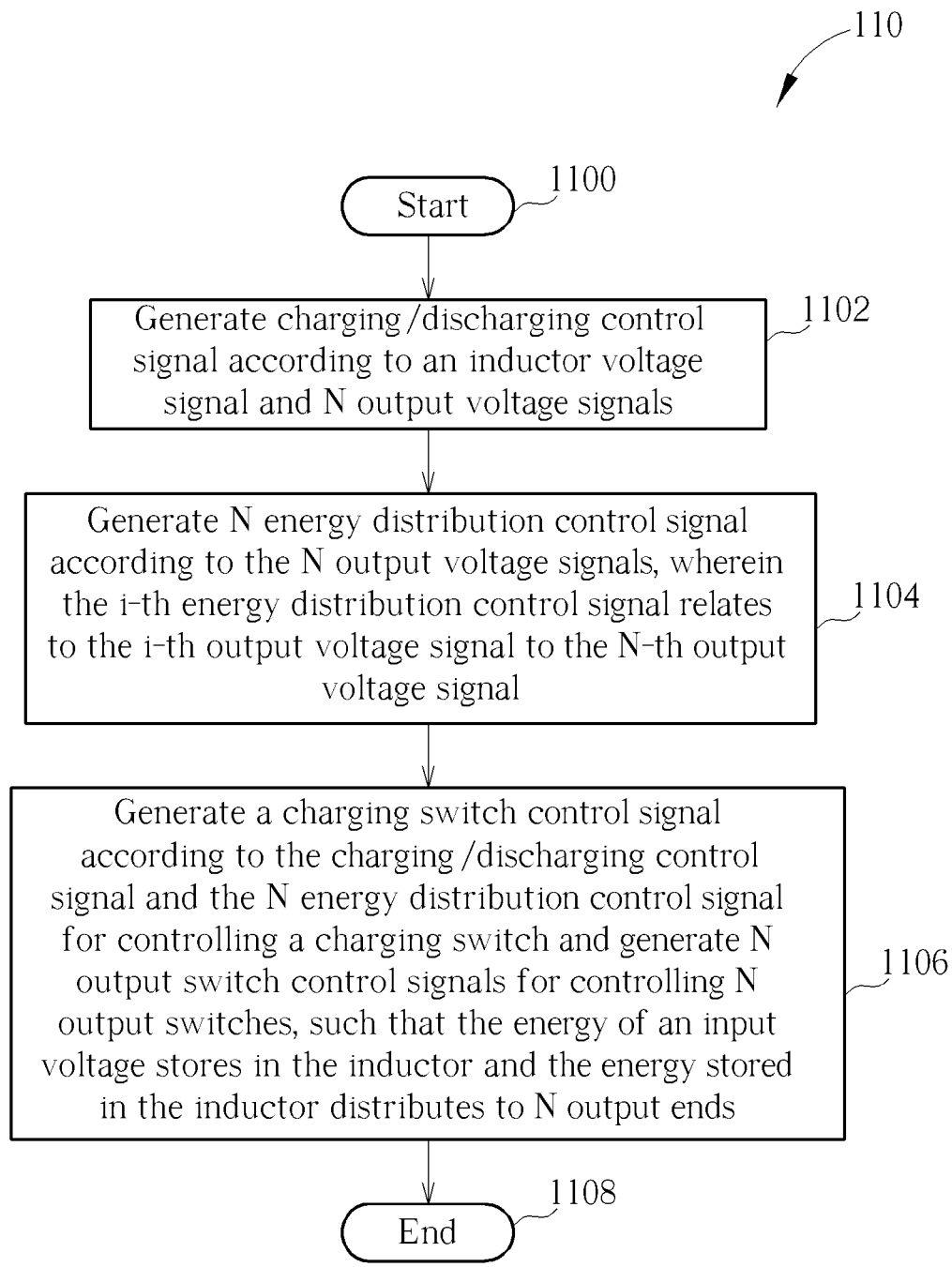
FIG. 11 is a schematic diagram of a method according to an embodiment of the present invention.

The operations of the switching converter 60 can be summarized to a process 110. As shown in FIG. 11, the process 110 includes following steps:

Step 1100: Start.

Step 1102: Generate charging/discharging control signal according to an inductor voltage signal and N output voltage signals.

Step 1104: Generate N energy distribution control signal according to the N output voltage signals, wherein the i-th energy distribution control signal relates to the i-th output voltage signal to the N-th output voltage signal.

Step 1106: Generate a charging switch control signal according to the charging/discharging control signal and the N energy distribution control signal for controlling a charging switch and generate N output switch control signals for controlling N output switches, such that the energy of an input voltage stores in the inductor and the energy stored in the inductor distributes to N output ends.

Step 1108: End.

The detail operations of the process 110 can be referred to the above, and are not narrated herein for brevity.

Figure 1:
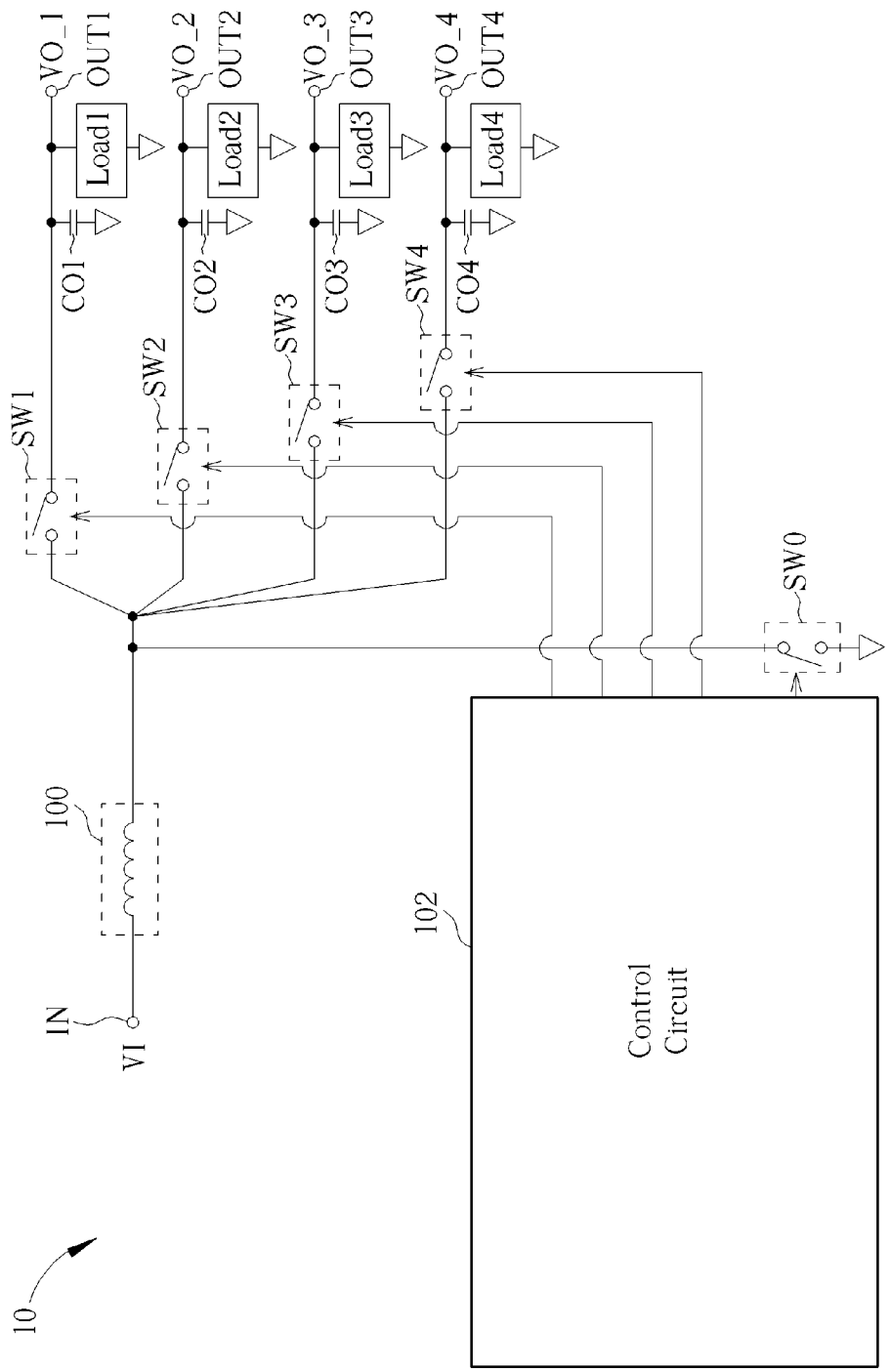
FIG. 1 is a schematic diagram of a conventional single inductor multiple output switching converter.
Figure 2:
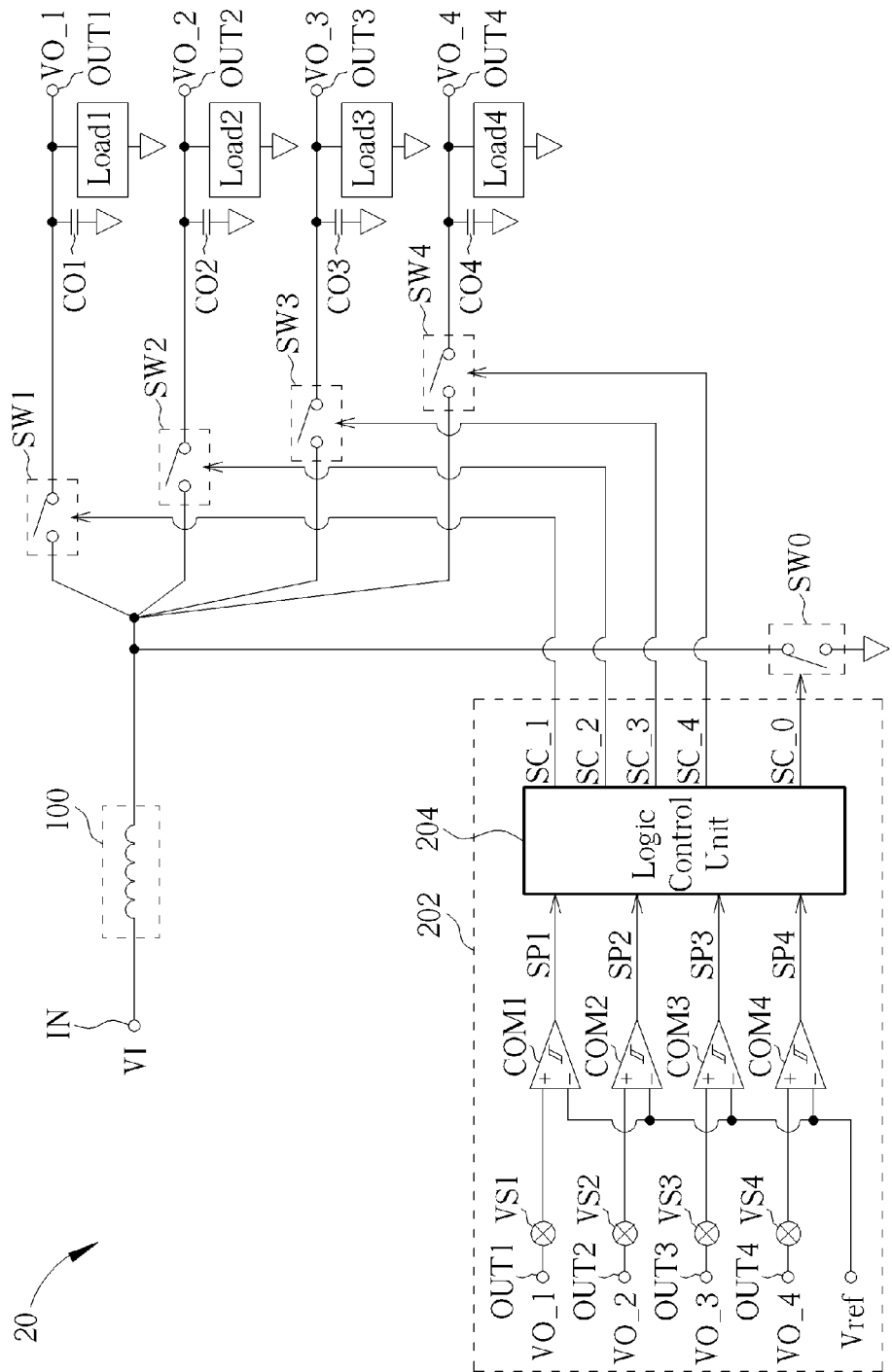
FIG. 2 is a schematic diagram of a conventional single inductor multiple output switching converter using the bang-bang control.
Figure 3:
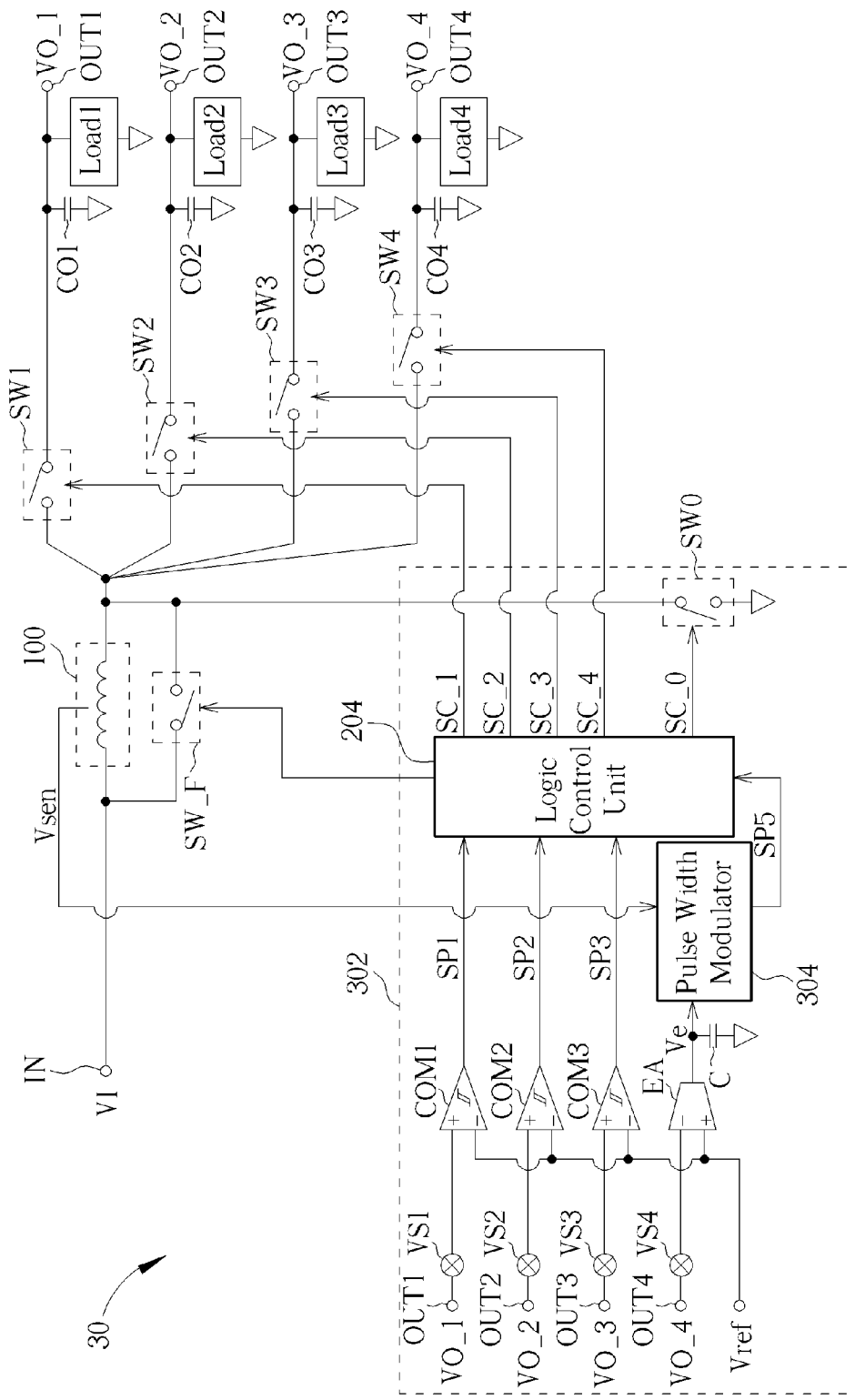
FIG. 3 is a schematic diagram of a conventional single inductor multiple output switching converter using pulse width modulation control.

To sum up, the conventional SIMO switching converter 30 shown in FIG. 3 usually determines the system energy status until the last stage outputs the output voltage signal. In comparison, the present invention utilizes charging/discharging control unit 602 for detecting the sum of the outputs of the error amplifiers related to each the output voltage signal to immediately determine whether the energy in the charging/discharging mode fits requirements. In other words, the present invention can immediately and rapidly reflect the sum of required energy for timely storing more energy in the inductor, to avoid the energy distributed to each output end is insufficient. More importantly, the present invention utilizes the energy distribution control unit 604 for feed-forwarding the energy statuses of post output stages, to equip the control capability of immediately reflecting energy information of post-stage and flexibly adjusting the distribution energy weights.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A switching converter, comprising:
   an input end, for receiving an input voltage;
   N output ends, for outputting N output voltage signals wherein N is a positive integer;
   an inductor, coupled to the input end for storing energy of the input voltage;
   a charging switch, coupled to the inductor for controlling a charging path of the inductor according to a charging switch control signal;
   N output switches, coupled to the inductor for controlling signal transmitting paths between the inductor and the N output ends according to N output switch control signals;
   a charging/discharging control unit, coupled to the N output ends for generating a charging/discharging control signal according to an inductor voltage signal and the N output voltage signals;
   an energy distribution control unit, coupled to the N output ends for generating N energy distribution control signals according to the N output voltage signal, wherein the i-th energy distribution control signal relates to the i-th output voltage signal to the N-th output voltage signal, $1 \leq i \leq N$; and
   a logic control unit, for generating the charging switch control signal according to the charging/discharging control signal and the N energy distribution control signals for controlling an on/off state of the charging switch, and generating the N output switch control signals for controlling on/off states of the N output switches, such that the energy of the input voltage stores in the inductor and the energy stored in the inductor distributes to the N output ends.

2. The switching converter of claim 1, wherein the charging/discharging control unit comprises:
   N first voltage scalers, coupled to the N output ends for outputting N first scale voltage signals according to the N output voltage signals;
   N first error amplifiers, coupled to the N first voltage scalers for generating N first error voltage signals according to the N first scale voltage signals and a first reference voltage signal;
   a first capacitor, coupled to the N first error amplifiers for generating an sum voltage signal; and
   a pulse width modulator, coupled to the N first error amplifiers and the first capacitor for generating the charging/discharging control signal according to the sum voltage signal and the inductor voltage signal.

3. The switching converter of claim 2, wherein each of the first voltage scaler is coupled to one of the N output ends for outputting the corresponding first scale voltage signal according to the corresponding output voltage signal, and each of the first error amplifier is coupled to one of the N first voltage scalers for generating the corresponding first error voltage signal according to the corresponding first scale voltage signal and the first reference voltage signal.

4. The switching converter of claim 1, wherein the logic control unit generates the charging switch control signal for controlling the charging switch to charge the inductor when the charging/discharging control signal indicates a total energy is insufficient.

5. The switching converter of claim 1, wherein the energy distribution control unit comprises:

N second voltage scalers, coupled to the N output ends for outputting N second scale voltage signals according to the N output voltage signals;

N second error amplifiers, coupled to the N second voltage scalers for generating N second error voltage signals according to the N second scale voltage signals and a second reference signal; and N second capacitors, separately coupled to the N second error amplifiers; and N ramp adjusting pulse width modulator, coupled to the N second error amplifiers and the N second capacitors for generating N energy distribution control signals according to the N second error voltage signals, wherein the i-th energy distribution control signal relates to the i-th output voltage signal to the N-th output voltage signal.

6. The switching converter of claim 5, wherein the i-th ramp adjusting pulse with modulator comprises:

(N−i) third error amplifiers, coupled to the (i+1)-th output end to the N-th output end for generating (N−i) third error voltage signals according to the (i+1)-th output voltage signal to the N-th output voltage signal;

a third capacitor, coupled to the (N−i) third error amplifiers for generating a ramp signal according to the (N−i) third error voltage signals, wherein a slope of the ramp signal relates to the (i+1)-th output voltage signal to the N-th output voltage signal; and a comparator, couple to the i-th second error amplifier and the third capacitor for generating the i-th energy distribution control signal according to the i-th second error voltage signal and the ramp signal.

7. The switching converter of claim 6 further comprising a reset switch, coupled to the (N−i) third error amplifiers and the third capacitor for periodically resetting the ramp signal according to a reset control signal.

8. The switching converter of claim 6 further comprising a current source, coupled to the (N−i) third error amplifiers and the third capacitor for providing a current to the third capacitor.

9. The switching converter of claim 5, wherein each second voltage scaler is coupled to one of the N output ends for outputting the corresponding second scale voltage signal according to the corresponding output voltage signal, and each second error amplifier is coupled to one of the N second voltage scalers for generating corresponding second error voltage signal according to the corresponding second scale voltage signal and the second reference voltage signal.

10. The switching converter of claim 1 further comprising N output capacitors separately coupled to the N output switches for storing the energy of the inductor, to provide the N output voltage signal to the N output ends.

11. The switching converter of claim 1 further comprising a flywheel switch coupled cross the inductor, wherein the logic control unit generates a flywheel switch control signal according to the charging/discharging control signal and the N energy distribution control signals, to control the flywheel switch.

12. A control method, comprising:

providing a switching converter, comprising an input end for receiving an input voltage; N output ends for outputting N output voltage signals wherein N is a positive integer; an inductor coupled to the input end for storing the energy of the input voltage, a charging switch coupled to the inductor for controlling the charging path of the inductor according to a charging switch control signal; and N output switches coupled to the inductor for controlling the signal transmitting paths between the inductor and the N output ends according to N output switch control signals;

generating a charging/discharging control signal according to an inductor voltage signal and the N output voltage signals;

generating N energy distribution control signals according to the N output voltage signals, wherein the i-th energy distribution control signal relates to the i-th output voltage signal to the N-th output voltage signal, $1 \leq i \leq N$; and generating the charging switch control signal for controlling the charging switch and generating the N output switch control signals for controlling the N output switches according to the charging/discharging control signal and the N energy distribution control signal, such that the energy of the input voltage stores in the inductor and the energy stored in the inductor distributes to the N output ends.

13. The control method of claim 12, wherein the step of generating the charging/discharging control signal according to the inductor voltage signal and the N output voltage signals comprises:

outputting N first scale voltage signals according to the N output voltage signals;

generating N first error voltage signals according to the N first scale voltage signals and a first reference voltage signal;

generating a sum voltage signal according to the N first error voltage signals; and generating the charging/discharging control signal according to the sum voltage signal and the inductor voltage signal.

14. The control method of claim 12, wherein the charging switch control signal is generated for controlling the charging switch to charge the inductor when the charging/discharging control signal instructs a total energy is insufficient.

15. The control method of claim 12, wherein the step of generating the N energy distribution control signal according to the N output voltage signals comprises:

generating N second scale voltage signals according to the N output voltage signals;

generating N second error voltage signals according to the N second scale voltage signals and a second reference voltage signal; and generating the N energy distribution control signals according to the N second error voltage signal, wherein the i-th energy distribution control signal relates to the i-th output voltage signal to the N-th output voltage signal.

16. The control method of claim 15, wherein the step of generating the N energy distribution control signal according to the N second error voltage signal comprises:

generating the (N−i)-th third error voltage signal according to the (i+1)-th output voltage signal to the N-th output voltage signal;

generating a ramp signal according to the (N−i)-th third error voltage signal, wherein a slope of the ramp signal relates to the (i+1)-th output voltage signal to the N-th output voltage signal; and generating the i-th energy distribution control signal according to the i-th second error voltage signal and the ramp signal.

* * * * *